US012807161B2

(12) United States Patent
Chen et al.

(10) Patent No.: US 12,807,161 B2
(45) Date of Patent: Nov. 24, 2026

(54) SYSTEM AND METHOD FOR WORK ZONE DETECTION FOR A VEHICLE

(71) Applicant: GM Global Technology Operations LLC, Detroit, MI (US)

(72) Inventors: Shu Chen, Rochester Hills, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 216 days.

(21) Appl. No.: 18/678,217

(22) Filed: May 30, 2024

(65) Prior Publication Data

US 2025/0368203 A1 Dec. 4, 2025

(51) Int. Cl.

| | |
|---|---|
| ***B60W 40/02*** | (2006.01) |
| ***G06V 10/762*** | (2022.01) |
| ***G06V 20/56*** | (2022.01) |

(52) U.S. Cl.

CPC ........... *B60W 40/02* (2013.01); *G06V 10/762* (2022.01); *G06V 20/56* (2022.01); *B60W 2420/403* (2013.01); *B60W 2552/50* (2020.02); *B60W 2552/53* (2020.02); *B60W 2554/406* (2020.02); *B60W 2555/60* (2020.02); *B60W 2556/45* (2020.02)

(58) Field of Classification Search

CPC ........... B60W 40/02; B60W 2420/403; B60W 2552/50; B60W 2552/53; B60W 2554/406; B60W 2555/60; B60W 2556/45; G06V 10/762; G06V 20/56

See application file for complete search history.

(56) References Cited

U.S. PATENT DOCUMENTS

| | | | | |
|---|---|---|---|---|
| 8,825,259 | B1 * | 9/2014 | Ferguson | G01S 13/865 340/901 |
| 9,056,395 | B1 * | 6/2015 | Ferguson | G01S 17/931 |
| 11,127,292 | B2 | 9/2021 | Bai et al. | |
| 12,287,634 | B2 * | 4/2025 | Lim | B60W 60/0011 |
| 2014/0067187 | A1 * | 3/2014 | Ferguson | B60W 60/0011 701/28 |
| 2018/0127929 | A1 * | 5/2018 | Pinson | E01C 19/48 |

(Continued)

OTHER PUBLICATIONS

Ester, M., et al., "A Density-Based Algorithm for Discovering Clusters in Large Spatial Databases with Noise," Proceedings of the Second International Conference on Knowledge Discovery and Data Mining, Aug. 1996, pp. 226-231.

*Primary Examiner* — Ashley L Redhead, Jr.

(74) *Attorney, Agent, or Firm* — Vivacqua Crane, PLLC

(57) ABSTRACT

A method for work zone detection for a vehicle may include receiving measurement data including perception data of an environment surrounding the vehicle and telemetry data of a plurality of remote vehicles in the environment about using a vehicle sensor. The method further may include identifying a start location and an end location of a work zone based at least in part on the measurement data. The work zone is represented as a plurality of road segments spanning from the start location to the end location. The method further may include determining a lane shift status of each of the plurality of road segments, determining a lane closure status of each of the plurality of road segments, determining a shoulder closure status of each of the plurality of road segments, and determining a speed limit for each of the plurality of road segments.

15 Claims, 6 Drawing Sheets

(56) References Cited

U.S. PATENT DOCUMENTS

| | | | | |
|---|---|---|---|---|
| 2021/0142659 | A1* | 5/2021 | Chen | G08G 1/0141 |
| 2022/0172616 | A1* | 6/2022 | Xu | G01C 21/3691 |
| 2022/0180739 | A1* | 6/2022 | Fowe | G08G 1/0145 |
| 2022/0180741 | A1* | 6/2022 | Fowe | G08G 1/0112 |
| 2023/0152800 | A1* | 5/2023 | Stenneth | B60W 60/0053<br>701/25 |
| 2023/0160713 | A1* | 5/2023 | Xu | B60W 60/00184<br>701/533 |
| 2023/0196915 | A1 | 6/2023 | Fowe | |
| 2023/0204372 | A1* | 6/2023 | Xu | G08G 1/0112 |
| 2024/0166238 | A1* | 5/2024 | Vijaya Kumar | B60W 30/09 |
| 2024/0194056 | A1* | 6/2024 | Stenneth | G06V 20/582 |
| 2024/0253624 | A1* | 8/2024 | Jean | H04W 4/029 |
| 2025/0349209 | A1* | 11/2025 | Wolleb | G08G 1/0129 |
| 2025/0368203 | A1* | 12/2025 | Chen | B60W 40/02 |

* cited by examiner

SYSTEM AND METHOD FOR WORK ZONE DETECTION FOR A VEHICLE

INTRODUCTION

The present disclosure relates to navigation, routing, and path planning systems and methods for vehicles, and more particularly, to acquisition, processing, and verification of data relating to work zones on roadways.

To increase occupant awareness and convenience, vehicles may be equipped with advanced driver assistance systems (ADAS) and/or automated driving systems (ADS). ADS systems may use various sensors to detect objects in the environment around the vehicle and control the vehicle to navigate the vehicle through the environment to a predetermined destination. ADAS and ADS systems may also use vehicle location obtained using global navigation satellite systems (GNSS) in conjunction with globally aligned maps for navigation routing, path pathing, lane identification, obstacle avoidance, and/or the like. Furthermore, vehicles may be equipped with capability to receive electronically transmitted data feeds containing information about road construction and/or road work zones. However, due to changing road conditions, changing road construction plans, data entry inaccuracies, and/or the like, data feeds providing information about road work may be outdated and/or inaccurate.

Thus, while current navigation, routing, and path planning systems and methods achieve their intended purpose, there is a need for a new and improved system and method for work zone detection for a vehicle.

SUMMARY

According to several aspects, a method for work zone detection for a vehicle is provided. The method may include receiving measurement data about an environment surrounding the vehicle using a vehicle sensor. The measurement data includes perception data of the environment and telemetry data of a plurality of remote vehicles in the environment. The method further may include identifying a start location and an end location of a work zone based at least in part on the measurement data. The work zone is represented as a plurality of road segments spanning from the start location to the end location. The method further may include determining a lane shift status of each of the plurality of road segments. The method further may include determining a lane closure status of each of the plurality of road segments. The method further may include determining a shoulder closure status of each of the plurality of road segments. The method further may include determining a speed limit for each of the plurality of road segments.

In another aspect of the present disclosure, identifying the start location and the end location of the work zone further may include detecting a cluster of work zone objects in the environment based at least in part on the perception data. The cluster of work zone objects includes at least one of: a work zone road sign, a work zone road barricade, a work zone vehicle, and a work zone worker. Identifying the start location and the end location of the work zone further may include determining the start location and the end location of the work zone based at least in part on a location of the cluster of work zone objects. Identifying the start location and the end location of the work zone further may include dividing the work zone into a plurality of road segments spanning from the start location to the end location of the work zone. Each of the plurality of road segments has a same length.

In another aspect of the present disclosure, detecting the cluster of work zone objects in the environment may include detecting the cluster of work zone objects in the environment based at least in part on the perception data using a Density Based Spatial Clustering of Applications with Noise (DBSCAN) algorithm.

In another aspect of the present disclosure, determining the lane shift status, the lane closure status, and the shoulder closure status further may include determining a plurality of lane lateral density distributions. Each of the plurality of lane lateral density distributions corresponds to one of a plurality of lanes of one of the plurality of road segments of the work zone. Determining the lane shift status, the lane closure status, and the shoulder closure status further may include determining the lane shift status of each of the plurality of road segments based at least in part on the plurality of lane lateral density distributions. Determining the lane shift status, the lane closure status, and the shoulder closure status further may include determining the lane closure status of each of the plurality of road segments based at least in part on the plurality of lane lateral density distributions. Determining the lane shift status, the lane closure status, and the shoulder closure status further may include determining the shoulder closure status of each of the plurality of road segments based at least in part on the plurality of lane lateral density distributions.

In another aspect of the present disclosure, determining the plurality of lane lateral density distributions further may include determining a plurality of overall lateral density distributions based at least in part on the telemetry data. Each of the plurality of overall lateral density distributions describes a spatial distribution of the plurality of remote vehicles within one of the plurality of road segments of the work zone. Determining the plurality of lane lateral density distributions further may include separating the plurality of overall lateral density distributions into the plurality of lane lateral density distributions using a Gaussian mixture model (GMM). Each of the plurality of lane lateral density distributions corresponds to one of the plurality of lanes within one of the plurality of road segments of the work zone.

In another aspect of the present disclosure, determining the lane shift status of each of the plurality of road segments further may include identifying a high-density area of each of the plurality of lanes within each of the plurality of road segments. The high-density area is a region within each of the plurality of lanes having a lane lateral density distribution greater than or equal to a predetermined lateral density threshold. Determining the lane shift status of each of the plurality of road segments further may include determining an average location of the high-density area of each of the plurality of lanes across the plurality of road segments. Determining the lane shift status of each of the plurality of road segments further may include determining a plurality of lane-shifted road segments. The plurality of lane-shifted road segments is a subset of the plurality of road segments. A location of the high-density area of at least one of the plurality of lanes in each of the plurality of lane-shifted road segments deviates from the average location of the high-density area of the at least one of the plurality of lanes by greater than or equal to a predetermined lane shift deviation threshold. Determining the lane shift status of each of the plurality of road segments further may include determining the lane shift status of each of the plurality of lane-shifted road segments to be a positive lane shift status.

In another aspect of the present disclosure, determining the lane closure status of each of the plurality of road segments further may include determining an average lane density in each of the plurality of lanes across the plurality of road segments based at least in part on the plurality of lane lateral density distributions. Determining the lane closure status of each of the plurality of road segments further may include determining a plurality of lane-closed road segments. The plurality of lane-closed road segments is a subset of the plurality of road segments. An average lane density of at least one of the plurality of lanes in each of the plurality of lane-closed road segments deviates from the average lane density of the at least one of the plurality of lanes by greater than or equal to a predetermined lane closed deviation threshold. Determining the lane closure status of each of the plurality of road segments further may include determining the lane closure status of each of the plurality of lane-closed road segments to be a positive lane closure status.

In another aspect of the present disclosure, determining the shoulder closure status of each of the plurality of road segments further may include identifying a high-density area of each of the plurality of lanes within each of the plurality of road segments. The high-density area is a region within each of the plurality of lanes having a lane lateral density distribution greater than or equal to a predetermined lateral density threshold. Determining the shoulder closure status of each of the plurality of road segments further may include determining an average high-density area width of each of the plurality of lanes across the plurality of road segments. Determining the shoulder closure status of each of the plurality of road segments further may include determining a plurality of shoulder-closed road segments. The plurality of shoulder-closed road segments is a subset of the plurality of road segments. A width of the high-density area of at least one of the plurality of lanes in each of the plurality of shoulder-closed road segments deviates from the average high-density area width of the at least one of the plurality of lanes by greater than or equal to a predetermined shoulder closure deviation threshold. Determining the shoulder closure status of each of the plurality of road segments further may include determining the shoulder closure status of each of the plurality of shoulder-closed road segments to be a positive shoulder closure status.

In another aspect of the present disclosure, determining the speed limit for each of the plurality of road segments further may include determining a plurality of overall speed density distributions based at least in part on the telemetry data. Each of the plurality of overall speed density distributions describes a speed distribution of the plurality of remote vehicles within one of the plurality of road segments of the work zone. Determining the speed limit for each of the plurality of road segments further may include determining an average speed for each of the plurality of road segments based on the plurality of overall speed density distributions. Determining the speed limit for each of the plurality of road segments further may include generating a plurality of truncated overall speed density distributions by truncating each of the plurality of overall speed density distributions to within a predetermined range around the average speed of each of the plurality of road segments. Determining the speed limit for each of the plurality of road segments further may include determining the speed limit for each of the plurality of road segments to be a truncated average speed for each of the plurality of road segments based on the plurality of truncated overall speed density distributions.

In another aspect of the present disclosure, the method further includes transmitting the start location and end location of the work zone, the lane shift status of each of the plurality of road segments, the lane closure status of each of the plurality of road segments, the shoulder closure status of each of the plurality of road segments, and the speed limit of each of the plurality of road segments to a remote device.

According to several aspects, a system for work zone detection for a vehicle is provided. The system may include a server system. The server system may include a server communication system and a server controller in electrical communication with the server communication system. The server controller is programmed to receive measurement data about an environment using the server communication system. The measurement data includes perception data of the environment and telemetry data of a plurality of remote vehicles in the environment. The server controller is further programmed to identify a start location and an end location of a work zone based at least in part on the measurement data. The work zone is represented as a plurality of road segments spanning from the start location to the end location. The server controller is further programmed to determine a lane shift status of each of the plurality of road segments. The server controller is further programmed to determine a lane closure status of each of the plurality of road segments. The server controller is further programmed to determine a shoulder closure status of each of the plurality of road segments. The server controller is further programmed to determine a speed limit for each of the plurality of road segments. The server controller is further programmed to transmit the start location and end location of the work zone, the lane shift status of each of the plurality of road segments, the lane closure status of each of the plurality of road segments, the shoulder closure status of each of the plurality of road segments, and the speed limit of each of the plurality of road segments to the plurality of remote vehicles using the server communication system.

In another aspect of the present disclosure, to identify the start location and the end location of the work zone, the server controller is further programmed to detect a cluster of work zone objects in the environment based at least in part on the perception data using a Density Based Spatial Clustering of Applications with Noise (DBSCAN) algorithm. The cluster of work zone objects includes at least one of: a work zone road sign, a work zone road barricade, a work zone vehicle, and a work zone worker. To identify the start location and the end location of the work zone, the server controller is further programmed to determine the start location and the end location of the work zone based at least in part on a location of the cluster of work zone objects. To identify the start location and the end location of the work zone, the server controller is further programmed to divide the work zone into a plurality of road segments spanning from the start location to the end location of the work zone. Each of the plurality of road segments has a same length.

In another aspect of the present disclosure, to determine the lane shift status of each of the plurality of road segments, the server controller is further programmed to determine a plurality of lane lateral density distributions. Each of the plurality of lane lateral density distributions corresponds to one of a plurality of lanes of one of the plurality of road segments of the work zone. To determine the lane shift status of each of the plurality of road segments, the server controller is further programmed to identify a high-density area of each of the plurality of lanes within each of the plurality of road segments. The high-density area is a region within each of the plurality of lanes having a lane lateral density distribution greater than or equal to a predetermined lateral density threshold. To determine the lane shift status of each of the plurality of road segments, the server controller is further programmed to determine an average location of the high-density area of each of the plurality of lanes across the plurality of road segments. To determine the lane shift status of each of the plurality of road segments, the server controller is further programmed to determine a plurality of lane-shifted road segments. The plurality of lane-shifted road segments is a subset of the plurality of road segments. A location of the high-density area of at least one of the plurality of lanes in each of the plurality of lane-shifted road segments deviates from the average location of the high-density area of the at least one of the plurality of lanes by greater than or equal to a predetermined lane shift deviation threshold. To determine the lane shift status of each of the plurality of road segments, the server controller is further programmed to determine the lane shift status of each of the plurality of lane-shifted road segments to be a positive lane shift status.

In another aspect of the present disclosure, to determine the lane closure status of each of the plurality of road segments, the server controller is further programmed to determine an average lane density in each of the plurality of lanes across the plurality of road segments based at least in part on the plurality of lane lateral density distributions. To determine the lane closure status of each of the plurality of road segments, the server controller is further programmed to determine a plurality of lane-closed road segments. The plurality of lane-closed road segments is a subset of the plurality of road segments. An average lane density of at least one of the plurality of lanes in each of the plurality of lane-closed road segments deviates from the average lane density of the at least one of the plurality of lanes by greater than or equal to a predetermined lane closed deviation threshold. To determine the lane closure status of each of the plurality of road segments, the server controller is further programmed to determine the lane closure status of each of the plurality of lane-closed road segments to be a positive lane closure status.

In another aspect of the present disclosure, to determine the shoulder closure status of each of the plurality of road segments, the server controller is further programmed to determine an average high-density area width of each of the plurality of lanes across the plurality of road segments. To determine the shoulder closure status of each of the plurality of road segments, the server controller is further programmed to determine a plurality of shoulder-closed road segments. The plurality of shoulder-closed road segments is a subset of the plurality of road segments. A width of the high-density area of at least one of the plurality of lanes in each of the plurality of shoulder-closed road segments deviates from the average high-density area width of the at least one of the plurality of lanes by greater than or equal to a predetermined shoulder closure deviation threshold. To determine the shoulder closure status of each of the plurality of road segments, the server controller is further programmed to determine the shoulder closure status of each of the plurality of shoulder-closed road segments to be a positive shoulder closure status.

In another aspect of the present disclosure, to determine the speed limit for each of the plurality of road segments, the server controller is further programmed to determine a plurality of overall speed density distributions based at least in part on the telemetry data. Each of the plurality of overall speed density distributions describes a speed distribution of the first plurality of remote vehicles within one of the plurality of road segments of the work zone. To determine the speed limit for each of the plurality of road segments, the server controller is further programmed to determine an average speed for each of the plurality of road segments based on the plurality of overall speed density distributions. To determine the speed limit for each of the plurality of road segments, the server controller is further programmed to generate a plurality of truncated overall speed density distributions by truncating each of the plurality of overall speed density distributions to within a predetermined range around the average speed of each of the plurality of road segments. To determine the speed limit for each of the plurality of road segments, the server controller is further programmed to determine the speed limit for each of the plurality of road segments to be a truncated average speed for each of the plurality of road segments based on the plurality of truncated overall speed density distributions.

In another aspect of the present disclosure, the system further includes a vehicle system. The vehicle system may include a vehicle sensor, a vehicle communication system, and a vehicle controller in electrical communication with the vehicle sensor and the vehicle communication system. The vehicle controller is programmed to receive the measurement data about the environment using the vehicle sensor. The vehicle controller is further programmed to transmit the measurement data to the server system using the vehicle communication system.

According to several aspects, a method for work zone detection for a vehicle is provided. The method may include receiving measurement data about an environment surrounding the vehicle using a vehicle sensor. The measurement data includes perception data of the environment and telemetry data of a plurality of remote vehicles in the environment. The method further may include identifying a start location and an end location of a work zone based at least in part on the measurement data. The work zone is represented as a plurality of road segments spanning from the start location to the end location. The method further may include determining a plurality of lane lateral density distributions. Each of the plurality of lane lateral density distributions corresponds to one of a plurality of lanes of one of the plurality of road segments of the work zone. The method further may include determining a lane shift status of each of the plurality of road segments based at least in part on the plurality of lane lateral density distributions. The method further may include determining a lane closure status of each of the plurality of road segments based at least in part on the plurality of lane lateral density distributions. The method further may include determining a shoulder closure status of each of the plurality of road segments based at least in part on the plurality of lane lateral density distributions. The method further may include determining a speed limit for each of the plurality of road segments. The method further may include transmitting the start location and end location of the work zone, the lane shift status of each of the plurality of road segments, the lane closure status of each of the plurality of road segments, the shoulder closure status of each of the plurality of road segments, and the speed limit of each of the plurality of road segments to a remote device.

In another aspect of the present disclosure, identifying the start location and the end location of the work zone further may include detecting a cluster of work zone objects in the environment based at least in part on the perception data using a Density Based Spatial Clustering of Applications with Noise (DBSCAN) algorithm. The cluster of work zone objects includes at least one of: a work zone road sign, a work zone road barricade, a work zone vehicle, and a work zone worker. Identifying the start location and the end location of the work zone further may include determining the start location and the end location of the work zone based at least in part on a location of the cluster of work zone objects. Identifying the start location and the end location of the work zone further may include dividing the work zone into a plurality of road segments spanning from the start location to the end location of the work zone. Each of the plurality of road segments has a same length.

In another aspect of the present disclosure, determining the lane shift status, the lane closure status, and the shoulder closure status further may include identifying a high-density area of each of the plurality of lanes within each of the plurality of road segments. The high-density area is a region within each of the plurality of lanes having a lane lateral density distribution greater than or equal to a predetermined lateral density threshold. Determining the lane shift status, the lane closure status, and the shoulder closure status further may include determining an average location of the high-density area of each of the plurality of lanes across the plurality of road segments. Determining the lane shift status, the lane closure status, and the shoulder closure status further may include determining a plurality of lane-shifted road segments. The plurality of lane-shifted road segments is a subset of the plurality of road segments. A location of the high-density area of at least one of the plurality of lanes in each of the plurality of lane-shifted road segments deviates from the average location of the high-density area of the at least one of the plurality of lanes by greater than or equal to a predetermined lane shift deviation threshold. Determining the lane shift status, the lane closure status, and the shoulder closure status further may include determining the lane shift status of each of the plurality of lane-shifted road segments to be a positive lane shift status. Determining the lane shift status, the lane closure status, and the shoulder closure status further may include determining an average lane density in each of the plurality of lanes across the plurality of road segments based at least in part on the plurality of lane lateral density distributions. Determining the lane shift status, the lane closure status, and the shoulder closure status further may include determining a plurality of lane-closed road segments. The plurality of lane-closed road segments is a subset of the plurality of road segments. An average lane density of at least one of the plurality of lanes in each of the plurality of lane-closed road segments deviates from the average lane density of the at least one of the plurality of lanes by greater than or equal to a predetermined lane closed deviation threshold. Determining the lane shift status, the lane closure status, and the shoulder closure status further may include determining the lane closure status of each of the plurality of lane-closed road segments to be a positive lane closure status. Determining the lane shift status, the lane closure status, and the shoulder closure status further may include determining an average high-density area width of each of the plurality of lanes across the plurality of road segments. Determining the lane shift status, the lane closure status, and the shoulder closure status further may include determining a plurality of shoulder-closed road segments. The plurality of shoulder-closed road segments is a subset of the plurality of road segments. A width of the high-density area of at least one of the plurality of lanes in each of the plurality of shoulder-closed road segments deviates from the average high-density area width of the at least one of the plurality of lanes by greater than or equal to a predetermined shoulder closure deviation threshold. Determining the lane shift status, the lane closure status, and the shoulder closure status further may include determining the shoulder closure status of each of the plurality of shoulder-closed road segments to be a positive shoulder closure status.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The emergence of data feeds providing information about road work, such as, for example, the Work Zone Data Exchange (WZDx), provides opportunities for increased vehicle occupant awareness of construction zones and optimized route planning for vehicle navigation systems and automated vehicle route planning systems. However, due to changing road conditions, changing road construction plans, data entry inaccuracies, and/or the like, data feeds providing information about road work may be outdated and/or inaccurate. Therefore, the present disclosure provides a new and improved system and method for work zone detection for a vehicle, enabling verification, correction, and/or update of data feeds providing information about road work.

Figure 1:
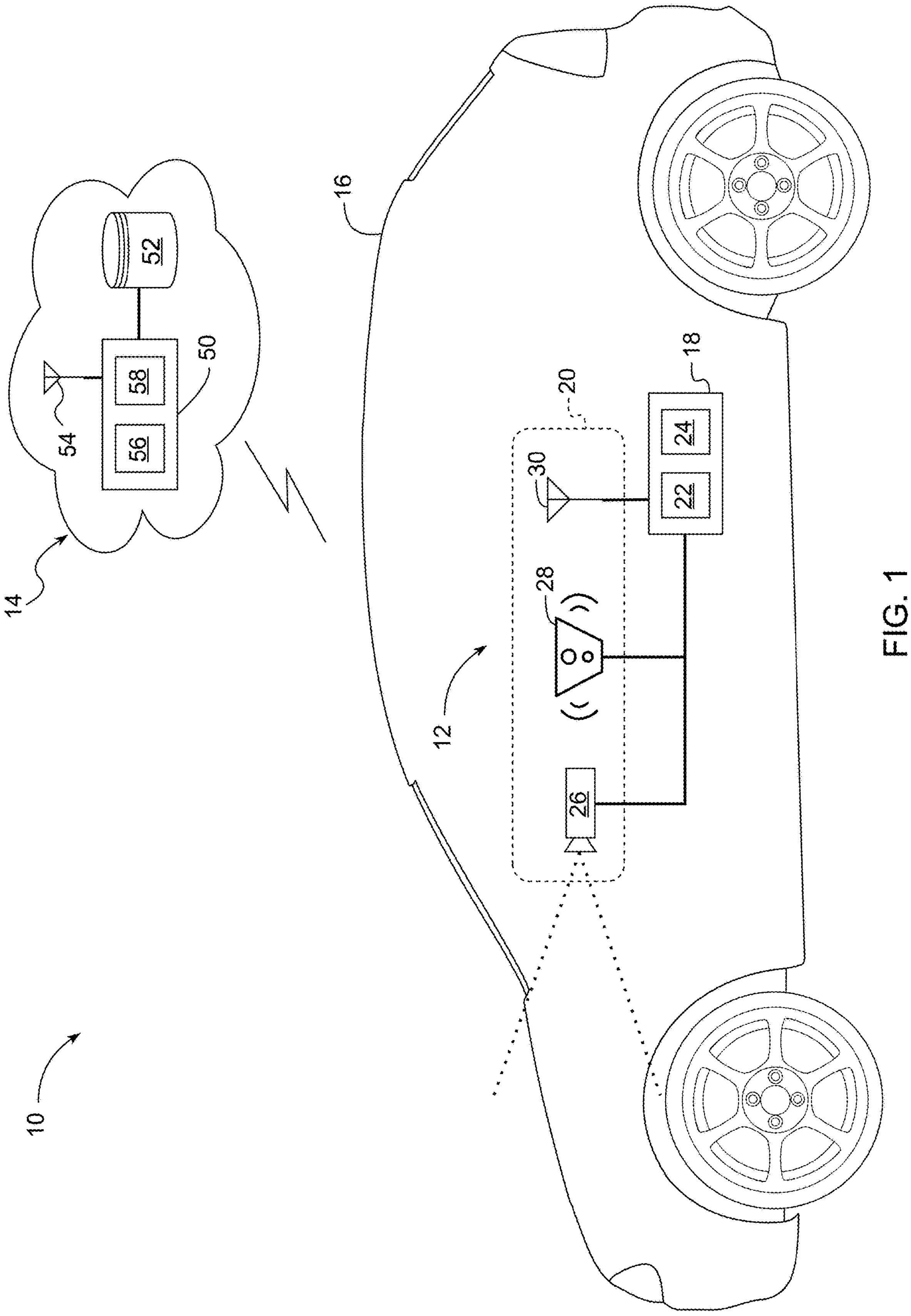
FIG. 1 is a schematic diagram of a system for work zone detection for a vehicle, according to an exemplary embodiment.

Referring to FIG. 1, a system for work zone detection for a vehicle is illustrated and generally indicated by reference number 10. The system 10 generally includes a vehicle system 12 and a server system 14.

The vehicle system 12 is shown with an exemplary vehicle 16. While a passenger vehicle is illustrated, it should be appreciated that the vehicle 16 may be any type of vehicle without departing from the scope of the present disclosure.

The vehicle system 12 generally includes a vehicle controller 18 and a plurality of vehicle sensors 20.

The vehicle controller 18 is used to implement a method 100 for work zone detection for a vehicle, as will be described below. The vehicle controller 18 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 18, a semiconductor-based microprocessor (in the form of a microchip or chip set), a macroprocessor, a combination thereof, or generally a device for executing instructions.

The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 18 to control various systems of the vehicle 16.

The vehicle controller 18 may also include multiple controllers which are in electrical communication with each other. The vehicle controller 18 may be inter-connected with additional systems and/or controllers of the vehicle 16, allowing the vehicle controller 18 to access data such as, for example, speed, acceleration, braking, and steering angle of the vehicle 16.

The vehicle controller 18 is in electrical communication with the plurality of vehicle sensors 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 18 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 20 are used to acquire information relevant to the vehicle 16. In an exemplary embodiment, the plurality of vehicle sensors 20 includes at least a perception sensor (e.g., a camera system 26, a LIDAR sensor 28, an ultrasonic ranging sensor (not shown), a radar sensor (not shown), a time-of-flight sensor (not shown), and/or the like) and a vehicle communication system 30.

The camera system 26 is a perception sensor used to capture images and/or videos of the environment surrounding the vehicle 16. In an exemplary embodiment, the camera system 26 includes a photo and/or video camera which is positioned to view the environment surrounding the vehicle 16. In a non-limiting example, the camera system 26 includes a camera affixed inside of the vehicle 16, for example, in a headliner of the vehicle 16, having a view through the windscreen. In another non-limiting example, the camera system 26 includes a camera affixed outside of the vehicle 16, for example, on a roof of the vehicle 16, having a view of the environment in front of the vehicle 16.

In another exemplary embodiment, the camera system 26 is a surround view camera system including a plurality of cameras (also known as satellite cameras) arranged to provide a view of the environment adjacent to all sides of the vehicle 16. In a non-limiting example, the camera system 26 includes a front-facing camera (mounted, for example, in a front grille of the vehicle 16), a rear-facing camera (mounted, for example, on a rear tailgate of the vehicle 16), and two side-facing cameras (mounted, for example, under each of two side-view mirrors of the vehicle 16). In another non-limiting example, the camera system 26 further includes an additional rear-view camera mounted near a center high mounted stop lamp of the vehicle 16.

It should be understood that camera systems having additional cameras and/or additional mounting locations are within the scope of the present disclosure. It should further be understood that various types of cameras, including, for example, stereoscopic cameras, infrared cameras, thermal cameras, and/or the like are within the scope of the present disclosure. The camera system 26 is in electrical communication with the vehicle controller 18, as discussed above.

The LiDAR sensor 28 is a perception sensor used for remote sensing and environmental mapping by emitting laser pulses and measuring the time it takes for the laser pulses to return to the LiDAR sensor 28 after hitting objects. In an exemplary embodiment, the LiDAR sensor 28 includes a LIDAR laser source, a LiDAR scanner or mirror, a LIDAR photodetector, and a LIDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 28 is in electrical communication with the vehicle controller 18, as discussed above.

The vehicle communication system 30 is used by the vehicle controller 18 to communicate with other systems external to the vehicle 16. For example, the vehicle communication system 30 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 16 and any remote system (e.g., vehicles, infrastructure, and/or remote systems).

In certain embodiments, the vehicle communication system 30 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 30 may further include an embedded universal integrated circuit card (eUICC) configured to store at least one cellular connectivity configuration profile, for example, an embedded subscriber identity module (eSIM) profile.

The vehicle communication system 30 is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system 30 may include one or more antennas and/or communication transceivers for receiving and/or transmitting signals, such as cooperative sensing messages (CSMs). The vehicle communication system 30 is configured to wirelessly communicate information between the vehicle 16 and another vehicle. Further, the vehicle communication system 30 is configured to wirelessly communicate information between the vehicle 16 and infrastructure or other vehicles. It should be understood that the vehicle communication system 30 may be integrated with the vehicle controller 18 (e.g., on a same circuit board with the vehicle controller 18 or otherwise a part of the vehicle controller 18) without departing from the scope of the present disclosure. The vehicle communication system 30 is in electrical communication with the vehicle controller 18, as discussed above.

In another exemplary embodiment, the plurality of vehicle sensors 20 further includes sensors to determine performance data and/or telemetric data about the vehicle 16. In a non-limiting example, the plurality of vehicle sensors 20 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 20 further includes sensors to determine information about an environment within the vehicle 16. In a non-limiting example, the plurality of vehicle sensors 20 further includes at least one of a seat occupancy sensor, a cabin air temperature sensor, a cabin motion detection sensor, a cabin camera, a cabin microphone, and/or the like.

In another exemplary embodiment, the plurality of vehicle sensors 20 further includes sensors to determine information and/or telemetric data about an environment surrounding the vehicle 16. In a non-limiting example, the plurality of vehicle sensors 20 further includes at least one of an ambient air temperature sensor, a barometric pressure sensor, and/or a global navigation satellite system (GNSS). The plurality of vehicle sensors 20 are in electrical communication with the vehicle controller 18, as discussed above.

With continued reference to FIG. 1, the server system is illustrated and generally indicated by reference number 14. The server system 14 includes a server controller 50 in electrical communication with a server database 52 and a server communication system 54. In a non-limiting example, the server system 14 is located in a server farm, datacenter, or the like, and connected to the internet via the server communication system 54.

The server controller 50 includes at least one server processor 56 and a server non-transitory computer readable storage device or server media 58. The description of the type and configuration given above for the vehicle controller 18 also applies to the server controller 50. In some examples, the server controller 50 may differ from the vehicle controller 18 in that the server controller 50 is capable of a higher processing speed, includes more memory, includes more inputs/outputs, and/or the like. In a non-limiting example, the server processor 56 and server media 58 of the server controller 50 are similar in structure and/or function to the processor 22 and the media 24 of the vehicle controller 18, as described above.

The server database 52 is used to store maps of roadways, including, for example, information about lane boundaries, road geometry, speed limits, traffic signs, construction zones and/or other relevant features. The server database 52 is further used to store crowdsourced perception and/or telematic data received from remote vehicles (e.g., the vehicle 16). In an exemplary embodiment, the server database 52 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 50 may execute software such as, for example, a database management system (DBMS), allowing data stored on the one or more mass storage devices to be organized and accessed.

The server communication system 54 is used to communicate with external systems, such as, for example, the vehicle controller 18 via the vehicle communication system 30. In a non-limiting example, the server communication system 54 is similar in structure and/or function to the vehicle communication system 30, as described above. In some examples, the server communication system 54 may differ from the vehicle communication system 30 in that the server communication system 54 is capable of higher power signal transmission, more sensitive signal reception, higher bandwidth transmission, additional transmission/reception protocols, and/or the like.

In an exemplary embodiment, the server system 14 is used to receive, store and aggregate telemetry data from a plurality of remote vehicles. In the scope of the present disclosure, telemetry data includes data which describe a state of operation of the plurality of remote vehicles. In a non-limiting example, the telemetry data includes vehicle location, vehicle speed, vehicle heading, vehicle acceleration, vehicle type/size, and/or the like. In the scope of the present disclosure, the plurality of remote vehicles includes any vehicle (e.g., the vehicle 16) operating within the environment.

In an exemplary embodiment, both the vehicle 16 and the plurality of remote vehicles are constantly measuring telemetry data and transmitting the telemetry data to the server communication system 54. The server controller 50 aggregates the received telemetry data and stores it in the server database 52.

Subsequently, the server database 52 may be queried to retrieve both current and historical telemetry data for vehicles in a chosen location, at a chosen time, of a chosen type, and/or the like. The server database 52 further may include detailed environmental maps including information about lane boundaries, road geometry, speed limits, traffic signs, construction zones and/or other relevant features. The server controller 50 may contextualize the received telemetry data using the detailed environmental maps.

In another exemplary embodiment, the server system 14 is further used to receive, transmit, and/or store information regarding traffic and/or road construction. In a non-limiting example, the server database 52 includes one or more work zone records corresponding to work zones. In the scope of the present disclosure, a work zone is a region of the environment having construction work affecting flow of traffic on the roadway. In a non-limiting example, the one or more work zone records may include fields indicating a location of the work zone (e.g., a start and end point of the work zone), a status of the work zone (e.g., active work zone, inactive work zone, and/or the like), a timeline of the work zone (e.g., work start date, work end date, work time, and/or the like), details about an effect of the work zone on traffic flow (e.g., information about lane/road closures), and/or the like. It should be understood that the one or more work zone records may include any number of fields and may be stored in any format (e.g., a machine-readable format such as JSON, GeoJSON, XML, and/or the like) and/or conforming to any standard or specification, such as, for example, the Work Zone Data Exchange (WZDx) specification or the Connected Work Zone (CWZ) standard supported by the United States Department of Transportation (USDOT).

In an exemplary embodiment, the one or more work zone records are provided via direct data entry into the server system 14. In another exemplary embodiment, the one or more work zone records are received from an external system via the server communication system 54. Due to changing road conditions, changing road construction plans, data entry inaccuracies, and/or the like, the one or more work zone records may be outdated and/or inaccurate. Therefore, the present disclosure provides a method 100 for work zone detection which may be used to update and/or correct the one or more work zone records, as will be discussed in greater detail below.

Figure 2:
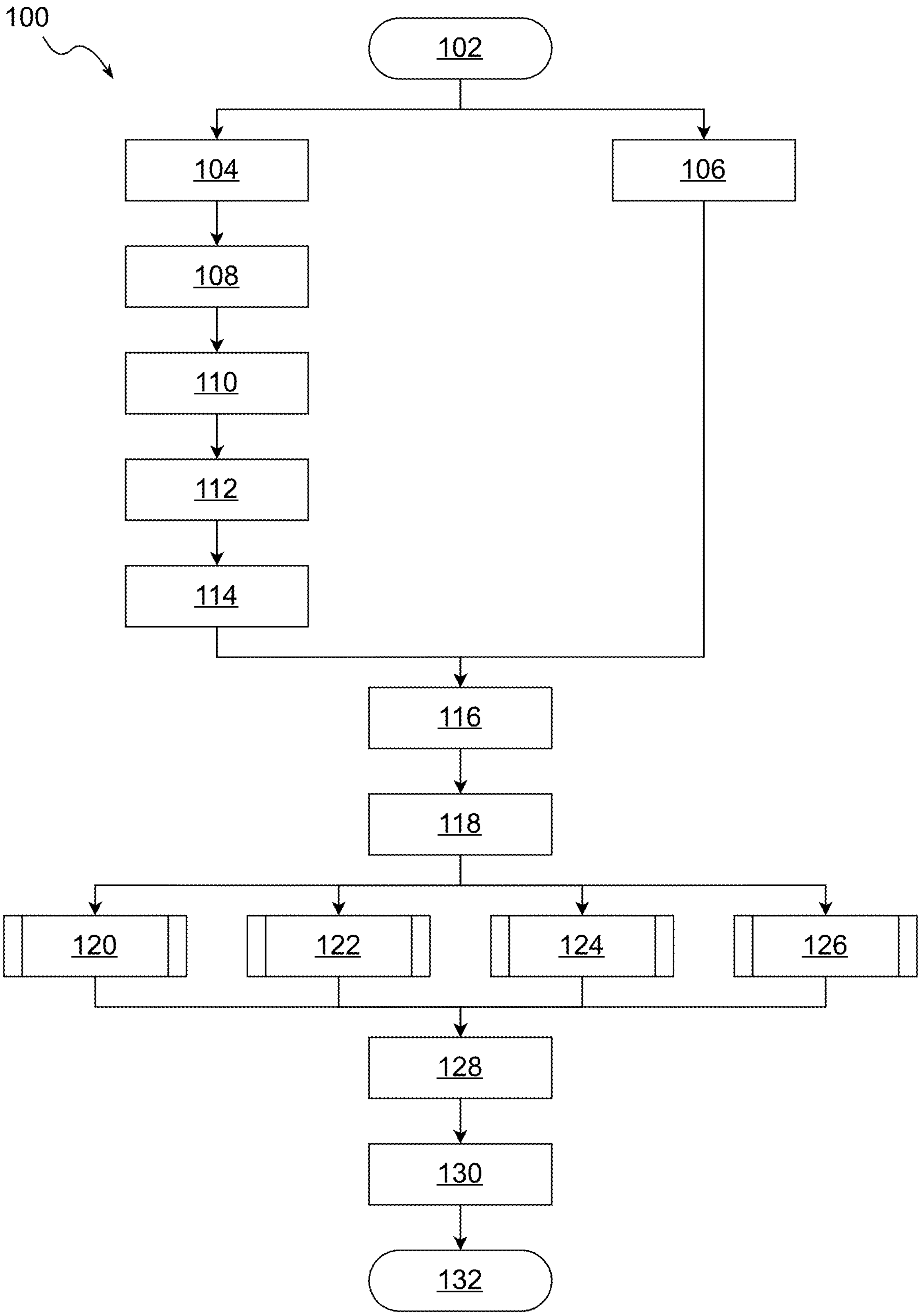
FIG. 2 is a flowchart of the method for work zone detection for a vehicle, according to an exemplary embodiment.

Referring to FIG. 2, a flowchart of the method 100 for work zone detection for a vehicle is provided. The method 100 begins at block 102 and proceeds to blocks 104 and 106. At block 104, the vehicle controller 18 of the vehicle system 12 uses one or more of the plurality of vehicle sensors 20 to receive measurement data about the environment surrounding the vehicle 16. In an exemplary embodiment, the camera system 26 is used to capture one or more images of the environment. In another exemplary embodiment, the LiDAR sensor 28 is used to measure distances to one or more objects in the environment. In a non-limiting example, the measurement data includes camera images, LiDAR measurements or environmental maps, and/or the like. After block 104, the method 100 proceeds to block 108.

At block 108, the vehicle controller 18 of the vehicle system 12 uses the vehicle communication system 30 of the vehicle system 12 to transmit the measurement data gathered at block 104 to the server communication system 54 of the server system 14. In an exemplary embodiment, the measurement data is transferred using a cellular data connection to the internet. After block 108, the method 100 proceeds to block 110.

At block 110, the server controller 50 of the server system 14 receives the measurement data transmitted at block 108 using the server communication system 54. The server controller 50 then analyzes the measurement data to detect a cluster of work zone objects in the environment. In the scope of the present disclosure, a work zone object includes any object in the environment which indicates the presence construction work affecting flow of traffic on a roadway in the environment. Examples of work zone objects may include work zone road signs (e.g., road signs indicating "ROAD WORK AHEAD", road signs having a particular color intended to indicate a work zone, and/or the like), work zone road barricades (e.g., construction cones, construction barrels, temporary barricades), work zone vehicles (e.g., vehicles having flashing lights or reflectors, heavy equipment like cranes, excavators, or dump trucks, and/or the like), and/or work zone workers (e.g., persons near the roadway, persons wearing high-visibility clothing, persons performing road work, and/or the like).

In the scope of the present disclosure, a cluster of work zone objects means a plurality of work zone objects which are located in the environment such that they are reachable from each other under certain predetermined conditions. In a non-limiting example, the predetermined conditions may include maximum distance between work zone objects, maximum lateral displacement between work zone objects, maximum angle between work zone objects, and/or the like.

In an exemplary embodiment, the server controller 50 detects a cluster of work zone objects in the environment based on the measurement data. In a non-limiting example, the server controller 50 uses a data clustering algorithm such as, for example, density based spatial clustering of applications with noise (DBSCAN), as discussed in "A Density-Based Algorithm for Discovering Clusters" by Ester et al. (Proceedings of the Second International Conference on Knowledge Discovery and Data Mining, Pgs. 226-231, August 1996), the entire contents of which is hereby incorporated by reference. It should be understood that alternative or additional data clustering algorithms, such as, for example, distributed DBSCAN (DDBSCAN), k-means, agglomerative clustering, mean shift, Gaussian mixture models, spectral clustering, affinity propagation, balanced iterative reducing and clustering using hierarchies (BIRCH), ordering points to identify the clustering structure (OPTICS), fuzzy c-means, and/or the like may be used without departing from the scope of the present disclosure. After block 110, the method 100 proceeds to block 112.

At block 112, the server controller 50 determines a start location and an end location of a work zone. In the scope of the present disclosure, a work zone is a region of the environment having construction work affecting flow of traffic on the roadway. In an exemplary embodiment, the start location and end location are determined based at least in part on the cluster of work zone objects detected at block 110. In a non-limiting example, the start location and end location are determined to be located at work zone objects at two extremes of the cluster (e.g., the start location is located at the location of a western-most work zone object in the cluster and the end location is located at the location of an eastern-most work zone object in the cluster). In another non-limiting example, the start location and the end location are determined to be located at two work zone objects in the cluster which are furthest away from each other. (e.g., by finding a distance between each possible combination of two work zone objects in the cluster and choosing the start and end locations based on the combination of two work zone objects having the largest distance between them). After block 112, the method 100 proceeds to block 114.

At block 114, the server controller 50 divides the work zone into a plurality of road segments. The plurality of road segments, considered together, span from the start location to the end location of the work zone identified at block 112. In an exemplary embodiment, the work zone is divided into a plurality of equally sized road segments having a predetermined length (e.g., one hundred meters). In another exemplary embodiment, the work zone is divided into a plurality of equally sized road segments having a length determined based on an overall length of the work zone (e.g., each road segment having a length which is ten percent of the overall length of the work zone). In another exemplary embodiment, the plurality of road segments are sized such that the work zone includes a predetermined quantity of road segments (e.g., ten road segments). In another exemplary embodiment, if the overall length of the work zone work zone is less than a predetermined minimum length threshold (e.g., one hundred meters), the entire work zone is represented by one road segment. It should be understood that various additional methods for dividing the work zone into the plurality of road segments, including methods resulting in road segments of varying lengths, are within the scope of the present disclosure. In an exemplary embodiment, the start location and the end location of the work zone identified at block 112 and data identifying the plurality of road segments (e.g., a start and end point of each of the plurality of road segments) is saved in the server database 52 for later use. After block 114, the method 100 proceeds to block 116, as will be described in greater detail below.

At block 106, the server controller 50 of the server system 14 receives telemetry data of the plurality of remote vehicles in the environment surrounding the vehicle 16 using the server communication system 54. As discussed above, both the vehicle 16 and the plurality of remote vehicles are constantly measuring telemetry data and transmitting the telemetry data to the server communication system 54. At block 106, the server controller 50 aggregates the received telemetry data and stores it in the server database 52. After block 106, the method 100 proceeds to block 116.

At block 116, the server controller 50 determines a plurality of overall lateral density distributions. Each of the plurality of overall lateral density distributions describes a spatial distribution of the plurality of remote vehicles within one of the plurality of road segments of the work zone. In an exemplary embodiment, the plurality of overall lateral density distributions are determined based on recent historical telemetry data received at block 106 and/or retrieved from the server database 52. In a non-limiting example, vehicle locations from the recent historical telemetry data are aggregated to generate a probability density function which describes the probability of finding one of the plurality of remote vehicles at any given lateral displacement within each of the plurality of road segments.

Figure 3:
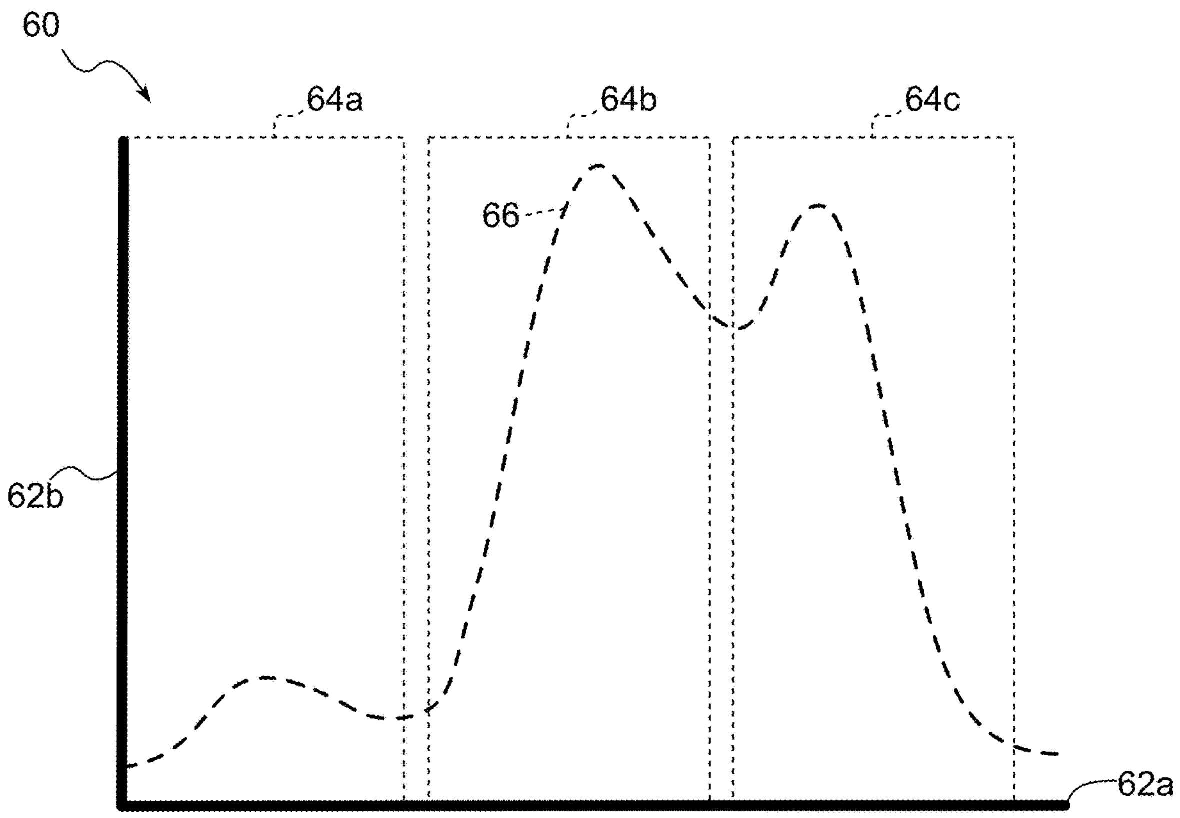
FIG. 3 is a first exemplary lateral density graph, according to an exemplary embodiment.

Referring to FIG. 3, a first exemplary lateral density graph 60 is shown. The first exemplary lateral density graph 60 includes an x-axis 62*a* indicating a location on the roadway (e.g., a displacement relative to a left edge of the roadway) and a y-axis 62*b* indicating a magnitude of vehicle density. The first exemplary lateral density graph 60 further includes boxes delineating lanes of the roadway, for example, a first lane 64*a*, a second lane 64*b*, and a third lane 64*c*. The first exemplary lateral density graph 60 further includes an exemplary overall lateral density distribution 66 for one of the plurality of road segments. The exemplary overall lateral density distribution 66 indicates a higher density in the second lane 64*b* and the third lane 64*c* relative to the first lane 64*a*, possibly indicating a closure or other obstruction in the first lane 64*a*. Referring again to FIG. 2, after block 116, the method 100 proceeds to block 118.

At block 118, the server controller 50 separates each of the plurality of overall lateral density distributions determined at block 116 into a plurality of lane lateral density distributions. Each of the plurality of lane lateral density distributions corresponds to one of a plurality of lanes of one of the plurality of road segments of the work zone. In an exemplary embodiment, the server controller 50 uses a Gaussian mixture model (GMM) to separate each of the plurality of overall lateral density distributions determined at block 116 into the plurality of lane lateral density distributions.

The GMM represents each of the plurality of overall lateral density distributions as a mixture of the plurality of lane lateral density distributions. Each of the plurality of lane lateral density distributions is defined by a mean vector, a covariance matrix, and a set of mixing coefficients that determine the weight of each of the plurality of lane lateral density distributions in the GMM. The GMM is trained using, for example, an Expectation-Maximization (EM) algorithm, which iteratively adjusts the mean vector, covariance matrix, and mixing coefficients of each of the plurality of lane lateral density distributions until the GMM accurately represents one of the plurality of overall lateral density distributions. This process is repeated until each of the plurality of overall lateral density distributions is accurately represented by a subset of the plurality of lane lateral density distributions.

Figure 4:
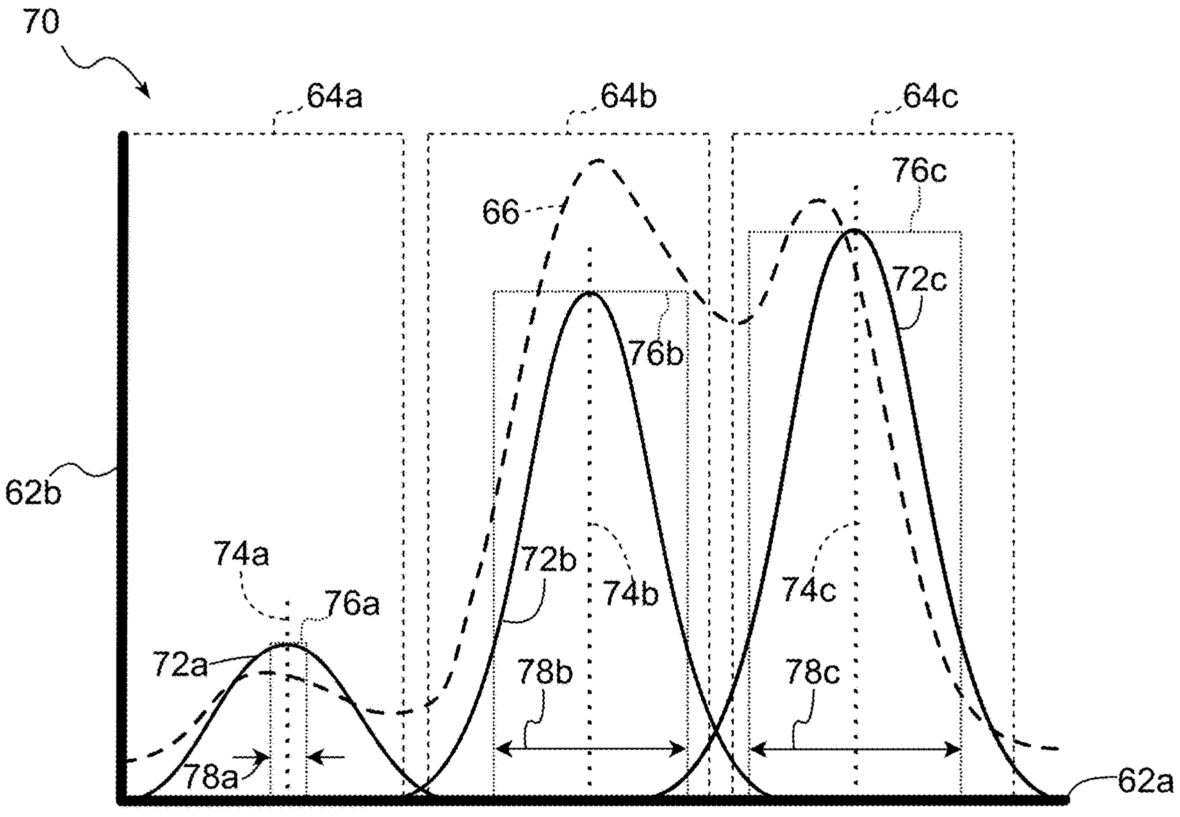
FIG. 4 is a second exemplary lateral density graph, according to an exemplary embodiment.

Referring to FIG. 4, a second exemplary lateral density graph 70 is shown. The second exemplary lateral density graph 70 includes the x-axis 62*a* indicating a location on the roadway (e.g., a displacement relative to a left edge of the roadway) and the y-axis 62*b* indicating the magnitude of vehicle density. The second exemplary lateral density graph 70 further includes boxes delineating lanes of the roadway, for example, the first lane 64*a*, the second lane 64*b*, and the third lane 64*c*. The second exemplary lateral density graph 70 further includes the exemplary overall lateral density distribution 66 for one of the plurality of road segments.

The second exemplary lateral density graph 70 further includes a first exemplary lane lateral density distribution 72*a* corresponding to the first lane 64*a*, a second exemplary lane lateral density distribution 72*b* corresponding to the second lane 64*b*, and a third exemplary lane lateral density distribution 72*c* corresponding to the third lane 64*c*. The first exemplary lane lateral density distribution 72*a* has a first mean 74*a*, the second exemplary lane lateral density distribution 72*b* has a second mean 74*b*, and the third exemplary lane lateral density distribution 72*c* has a third mean 74*c*. As discussed above, the first exemplary lane lateral density distribution 72*a*, the second exemplary lane lateral density distribution 72*b*, and the third exemplary lane lateral density distribution 72*c* are determined based on the exemplary overall lateral density distribution 66 using, for example, a Gaussian mixture model (GMM) trained using an Expectation-Maximization (EM) algorithm.

Furthermore, a high-density area of each of the plurality of lanes is defined within each of the plurality of road segments. In a non-limiting example, the high-density area is a region within each of the plurality of lanes having a lane lateral density distribution greater than or equal to a predetermined lateral density threshold. In another non-limiting example, the high-density area is defined relative to the mean of each of the plurality of lane lateral density distributions, for example, as an area located within plus or minus one standard deviation of the mean.

In the second exemplary lateral density graph 70, the first lane 64*a* has a first high-density area 76*a* determined based on the first exemplary lane lateral density distribution 72*a*, the second lane 64*b* has a second high-density area 76*b* determined based on the second exemplary lane lateral density distribution 72*b*, and the third lane 64*c* has a third high-density area 76*c* determined based on the third exemplary lane lateral density distribution 72*c*. The first high-density area 76*a* is centered on the first mean 74*a*, such that a location of the first high-density area 76*a* is defined as the location of the first mean 74*a*. The second high-density area 76*b* is centered on the second mean 74*b*, such that a location of the second high-density area 76*b* is defined as the location of the second mean 74*b*. The third high-density area 76*c* is centered on the third mean 74*c*, such that a location of the third high-density area 76*c* is defined as the location of the third mean 74*c*.

A width of the first high-density area 76*a* is defined as a first high-density area width 78*a*. A width of the second high-density area 76*b* is defined as a second high-density area width 78*b*. A width of the third high-density area 76*c* is defined as a third high-density area width 78*c*. Referring again to FIG. 2, after block 118, the method 100 proceeds to blocks 120, 122, 124, and 126.

At block 120, the server controller 50 determines a lane shift status of each of the plurality of road segments. In the scope of the present disclosure, the lane shift status includes either a positive lane shift status or a negative lane shift status. The positive lane shift status indicates an occurrence of a lane shift within a road segment. In the scope of the present disclosure, a lane shift is a lateral displacement of a lane of a roadway due to road construction. In a non-limiting example, a lane shift includes shifting of a first lane of a northbound highway across a median into a first lane of a southbound highway. Determination of the lane shift status of each of the plurality of road segments will be discussed in greater detail below. After block 120, the method 100 proceeds to block 128, as will be discussed in greater detail below.

At block 122, the server controller 50 determines a lane closure status of each of the plurality of road segments. In the scope of the present disclosure, the lane closure status includes either a positive lane closure status or a negative lane closure status. The positive lane closure status indicates an occurrence of a lane closure within a road segment. In the scope of the present disclosure, a lane closure is a closure or blocking of a lane of a roadway due to road construction. Determination of the lane closure status of each of the plurality of road segments will be discussed in greater detail below. After block 122, the method 100 proceeds to block 128, as will be discussed in greater detail below.

At block 124, the server controller 50 determines a shoulder closure status of each of the plurality of road segments. In the scope of the present disclosure, the shoulder closure status includes either a positive shoulder closure status or a negative shoulder closure status. The positive shoulder closure status indicates an occurrence of a shoulder closure within a road segment. In the scope of the present disclosure, a shoulder closure is a closure or blocking of a shoulder of a roadway or narrowing of a lane of a roadway due to road construction. Determination of the shoulder closure status of each of the plurality of road segments will be discussed in greater detail below. After block 124, the method 100 proceeds to block 128, as will be discussed in greater detail below.

At block 126, the server controller 50 determines a speed limit of each of the plurality of road segments. In the scope of the present disclosure, the speed limit is an acceptable speed for travel in the road segment based on legal regulations, environmental conditions, and/or road conditions. Determination of the speed limit of each of the plurality of road segments will be discussed in greater detail below. After block 126, the method 100 proceeds to block 128.

At block 128, the server controller 50 receives one or more work zone records as discussed above in reference to the server system 14. In an exemplary embodiment, the one or more work zone records are received from authorities such as federal governments, local governments, municipalities, road maintenance agencies, and/or the like. The one or more work zone records are saved in the server database 52 for later retrieval. After block 128, the method 100 proceeds to block 130.

At block 130, the server controller 50 queries the server database 52 to retrieve work zone records having start locations and/or end locations in the vicinity of (e.g., within a predetermined distance or radius of) the start location and the end location of the work zone determined at block 112. The server controller 50 then compares the data in the retrieved work zone records to the information determined at blocks 112, 120, 122, 124, and 126. If discrepancies are identified between the retrieved work zone records and the information determined at blocks 112, 120, 122, 124, and 126, the retrieved work zone records are updated based at least in part on the information determined at blocks 112, 120, 122, 124, and 126 and the updated work zone records are subsequently transmitted back to the source of the work zone records (i.e., the federal governments, local governments, municipalities, road maintenance agencies, and/or the like) using the server communication system 54.

In a non-limiting example, the location of the work zone (i.e., the start and end point of the work zone) contained in the retrieved work zone records may differ from the start location and the end location of the work zone determined at block 112. Therefore, the retrieved work zone record is updated to reflect the start location and the end location of the work zone determined at block 112 and transmitted back to the source of the retrieved work zone record for storage, processing, and/or redistribution to other systems (e.g., the plurality of remote vehicles). In another non-limiting example, the lane shift, lane closure, shoulder closure, and/or speed limit information contained in the retrieved work zone records may differ from the lane shift, lane closure, shoulder closure, and/or speed limit information determined at blocks 120, 122, 124, and 126. Therefore, the retrieved work zone record is updated to reflect the lane shift, lane closure, shoulder closure, and/or speed limit information determined at blocks 120, 122, 124, and 126 and transmitted back to the source of the retrieved work zone record for storage, processing, and/or redistribution to other systems or remote devices (e.g., the plurality of remote vehicles). After block 130, the method 100 proceeds to enter a standby state at block 132.

In an exemplary embodiment, the method 100 repeatedly exits the standby state 132 and restarts at block 102. In a non-limiting example, the method 100 is restarted on a timer, for example, every three hundred milliseconds.

Figure 5A:
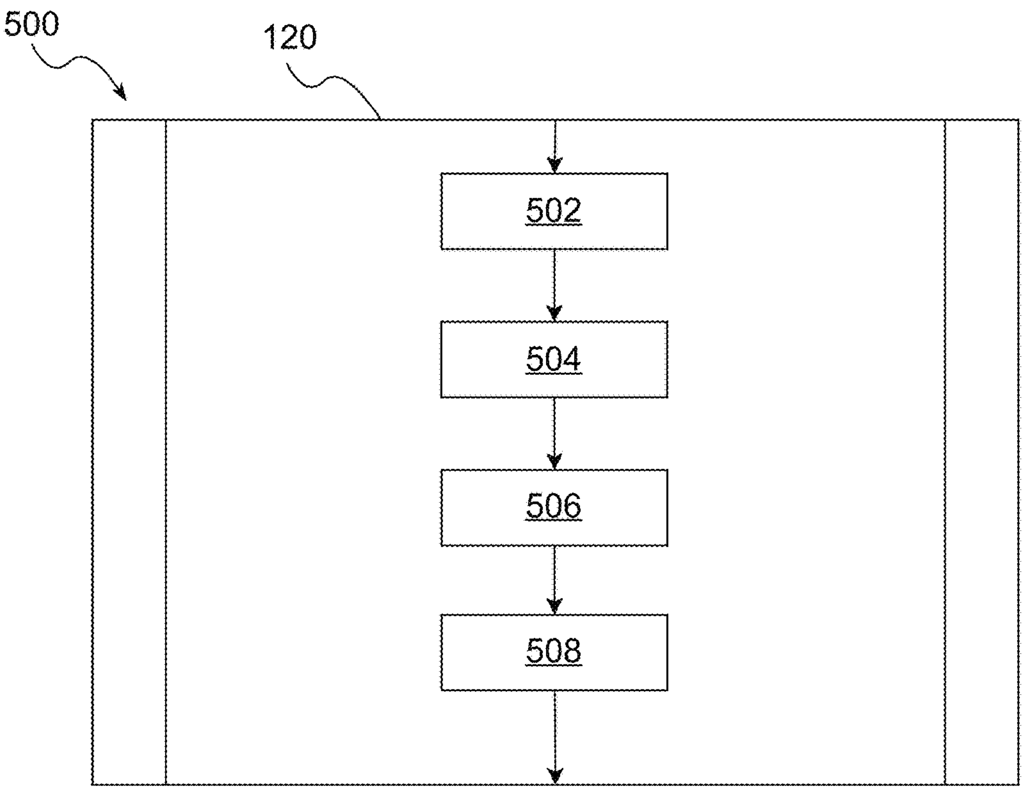
FIG. 5A is a flowchart of a method for determining a lane shift status of each of a plurality of road segments, according to an exemplary embodiment.

Referring to FIG. 5A, a flowchart of an exemplary embodiment 500 of block 120 (i.e., a method for determining a lane shift status of each of the plurality of road segments) is shown. The exemplary embodiment 500 of block 120 begins at block 502. Referring to FIG. 5A and with continued reference to FIG. 4, at block 502, the server controller 50 identifies the high-density area of each of the plurality of lanes within each of the plurality of road segments (e.g., the first high-density area 76*a*, the second high-density area 76*b*, and the third high-density area 76*c*)

as discussed above in reference to FIG. 4. In a non-limiting example, the high-density area is a region within each of the plurality of lanes having a lane lateral density distribution greater than or equal to a predetermined lateral density threshold. In another non-limiting example, the high-density area is defined relative to the mean of each of the plurality of lane lateral density distributions, for example, as an area located within plus or minus one standard deviation of the mean. After block 502, the exemplary embodiment 500 of block 120 proceeds to block 504.

At block 504, the server controller 50 determines an average location of the high-density area in each lane across the plurality of road segments. As discussed above in reference to FIG. 4 for a single road segment, in a non-limiting example, the first high-density area 76*a* is centered on the first mean 74*a*, such that a location of the first high-density area 76*a* is defined as the location of the first mean 74*a*. The second high-density area 76*b* is centered on the second mean 74*b*, such that a location of the second high-density area 76*b* is defined as the location of the second mean 74*b*. The third high-density area 76*c* is centered on the third mean 74*c*, such that a location of the third high-density area 76*c* is defined as the location of the third mean 74*c*.

Therefore, to determine the average location of the high-density area in each lane across the plurality of road segments, the location of the high-density area in each lane is averaged across all of the plurality of road segments. In a non-limiting example, the average location of the high-density area in each lane across the plurality of road segments is normalized to a known road edge location based on detailed maps, such that turns or curves in the road do not affect the average location of the high-density area in each lane across the plurality of road segments. After block 504, the exemplary embodiment 500 of block 120 proceeds to block 506.

At block 506, the server controller 50 determines a plurality of lane-shifted road segments. The plurality of lane-shifted road segments is a subset of the plurality of road segments. In an exemplary embodiment, each of the plurality of lane shifted road segments is one of the plurality of road segments wherein a location of the high-density area of at least one of the plurality of lanes deviates from the average location of the high-density area of the at least one of the plurality of lanes by greater than or equal to a predetermined lane shift deviation threshold. In another exemplary embodiment, each of the plurality of lane shifted road segments is one of the plurality of road segments wherein a distance between a location of the high-density area of a first lane of the plurality of lanes a location of the high-density area of a second lane of the plurality of lanes deviates from an average distance by greater than or equal to a predetermined distance deviation threshold.

Figure 5B:
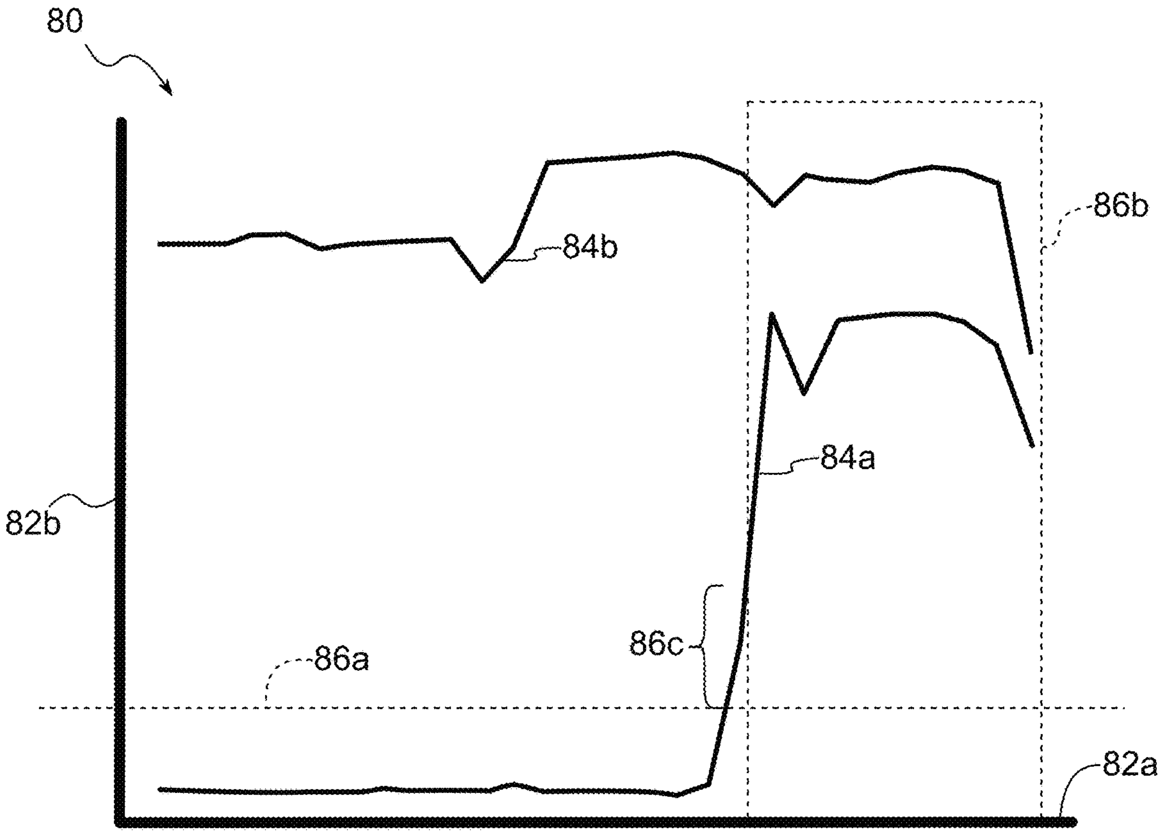
FIG. 5B is an exemplary lane-shift graph, according to an exemplary embodiment.

Referring to FIG. 5B, an exemplary lane-shift graph 80 is shown. The exemplary lane-shift graph 80 includes an x-axis 82*a* indicating a road segment (i.e., increasing from left to right, such that points near the left of the x-axis 82*a* represent road segments near the start location of the work zone and points near the right of the x-axis 82*a* represent road segments near the end location of the work zone). The exemplary lane-shift graph 80 further includes a y-axis 82*b* indicating location relative to a road edge.

The exemplary lane-shift graph 80 further includes a first curve 84*a* illustrating changes in a location of the high-density area over the plurality of road segments for a first exemplary lane and a second curve 84*b* illustrating changes in a location of the high-density area over the plurality of road segments for a second exemplary lane. The average location of the high-density area of the first exemplary lane is indicated by a first dashed line 86*a*. The plurality of lane shifted road segments are indicated by a first dashed box 86*b* which includes road segments where the location of the high-density area for the first exemplary lane (i.e., the first curve 84*a*) deviates from the average location of the high-density area of the first exemplary lane (i.e., the first dashed line 86*a*) by at least an exemplary lane shift deviation threshold 86*c*. Referring again to FIG. 5A, after block 506, the exemplary embodiment 500 of block 120 proceeds to block 508.

At block 508, the lane shift status of each of the plurality of lane-shifted road segments determined at block 506 is determined to be the positive lane shift status. After block 508, the exemplary embodiment 500 of block 120 is concluded, and the method 100 proceeds as discussed above.

Figure 6:
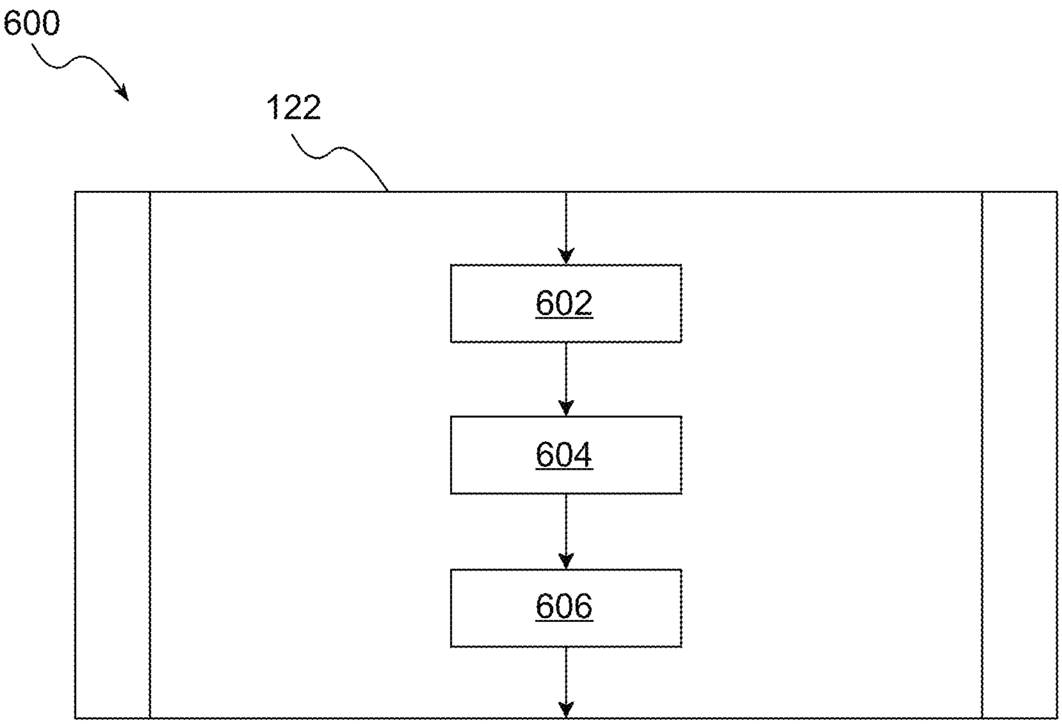
FIG. 6 is a flowchart of a method for determining a lane closure status of each of the plurality of road segments, according to an exemplary embodiment.

Referring to FIG. 6, a flowchart of an exemplary embodiment 600 of block 122 (i.e., a method for determining a lane closure status of each of the plurality of road segments) is shown. The exemplary embodiment 600 of block 122 begins at block 602. At block 602, the server controller 50 determines an average lane density in each of the plurality of lanes across the plurality of road segments. In an exemplary embodiment, the average lane density in a given lane of a given road segment is equal to the mean of the lane lateral density distribution corresponding to the given lane and the given road segment. In a non-limiting example, with reference to FIG. 4, the average lane density in the first lane 64*a* in one segment is determined to be the first mean 74*a*. To determine the average lane density in each of the plurality of lanes across the plurality of road segments, the average lane density in each of the plurality of lanes is averaged across the plurality of road segments. Referring again to FIG. 6, after block 602, the exemplary embodiment 600 of block 122 proceeds to block 604.

At block 604, the server controller 50 determines a plurality of lane-closed road segments. The plurality of lane-closed road segments is a subset of the plurality of road segments. In an exemplary embodiment, each of the plurality of lane closed road segments is one of the plurality of road segments wherein the average lane density deviates from the average lane density of the at least one of the plurality of lanes across the plurality of road segments determined at block 602 by greater than or equal to a predetermined lane closed deviation threshold. In another exemplary embodiment, each of the plurality of lane closed road segments is one of the plurality of road segments wherein the average lane density deviates from a historical average lane density (e.g., determined based on processing of historical telemetric data stored in the server database 52) by greater than or equal to the predetermined lane closed deviation threshold. After block 604, the exemplary embodiment 600 of block 122 proceeds to block 606.

At block 606, the lane closure status of each of the plurality of lane-closed road segments determined at block 604 is determined to be the positive lane closure status. After block 606, the exemplary embodiment 600 of block 122 is concluded, and the method 100 proceeds as discussed above.

Figure 7:
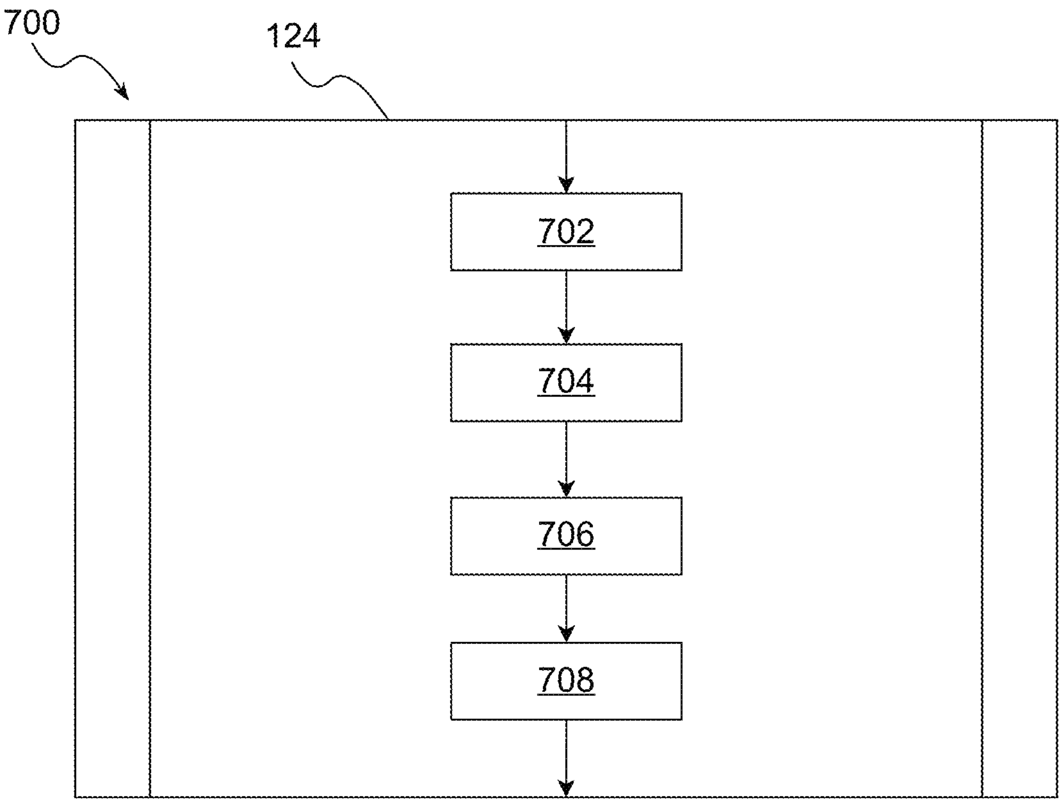
FIG. 7 is a flowchart of a method for determining a shoulder closure status of each of the plurality of road segments, according to an exemplary embodiment.

Referring to FIG. 7, a flowchart of an exemplary embodiment 700 of block 124 (i.e., a method for determining a shoulder closure status of each of the plurality of road segments) is shown. The exemplary embodiment 700 of block 124 begins at block 702. Referring to FIG. 7 and with continued reference to FIG. 4, at block 702, the server controller 50 identifies the high-density area of each of the plurality of lanes within each of the plurality of road segments (e.g., the first high-density area 76*a*, the second high-density area 76*b*, and the third high-density area 76*c*) as discussed above in reference to FIG. 4. In a non-limiting example, the high-density area is a region within each of the plurality of lanes having a lane lateral density distribution greater than or equal to a predetermined lateral density threshold. In another non-limiting example, the high-density area is defined relative to the mean of each of the plurality of lane lateral density distributions, for example, as an area located within plus or minus one standard deviation of the mean. After block 702, the exemplary embodiment 700 of block 124 proceeds to block 704.

At block 704, the server controller 50 determines an average high-density area width of the high-density area in each lane across the plurality of road segments. As discussed above in reference to FIG. 4 for a single road segment, in one example, the first high-density area width 78*a*, the second high-density area width 78*b*, and the third high-density area width 78*c* depend on the predetermined lateral density threshold. In another non-limiting example, the first high-density area width 78*a*, the second high-density area width 78*b*, and the third high-density area width 78*c* depend on a predetermined width around the mean of each of the plurality of lane lateral density distributions, for example, plus or minus one standard deviation of the mean.

Therefore, to determine the average high-density area width of the high-density area in each lane across the plurality of road segments, the high-density area width in each lane is averaged across all of the plurality of road segments. After block 704, the exemplary embodiment 700 of block 124 proceeds to block 706.

At block 706, the server controller 50 determines a plurality of shoulder-closed road segments. The plurality of shoulder-closed road segments is a subset of the plurality of road segments. In an exemplary embodiment, each of the plurality of shoulder-closed road segments is one of the plurality of road segments wherein a width of the high-density area of at least one of the plurality of lanes deviates from the average high-density area width of the at least one of the plurality of lanes determined at block 704 by greater than or equal to a predetermined shoulder closure deviation threshold. This is because closing of the shoulder may result in effective narrowing of lanes as objects in the shoulder cause vehicle occupants to tend to drive in a narrower area of adjacent lanes. Therefore, the same method as discussed above for determining shoulder closure status may also be used to determine a lane narrowing status. After block 706, the exemplary embodiment 700 of block 124 proceeds to block 708.

At block 708, the shoulder closure status of each of the plurality of shoulder-closed road segments determined at block 706 is determined to be the positive shoulder closure status. After block 708, the exemplary embodiment 700 of block 124 is concluded, and the method 100 proceeds as discussed above.

Figure 8A:
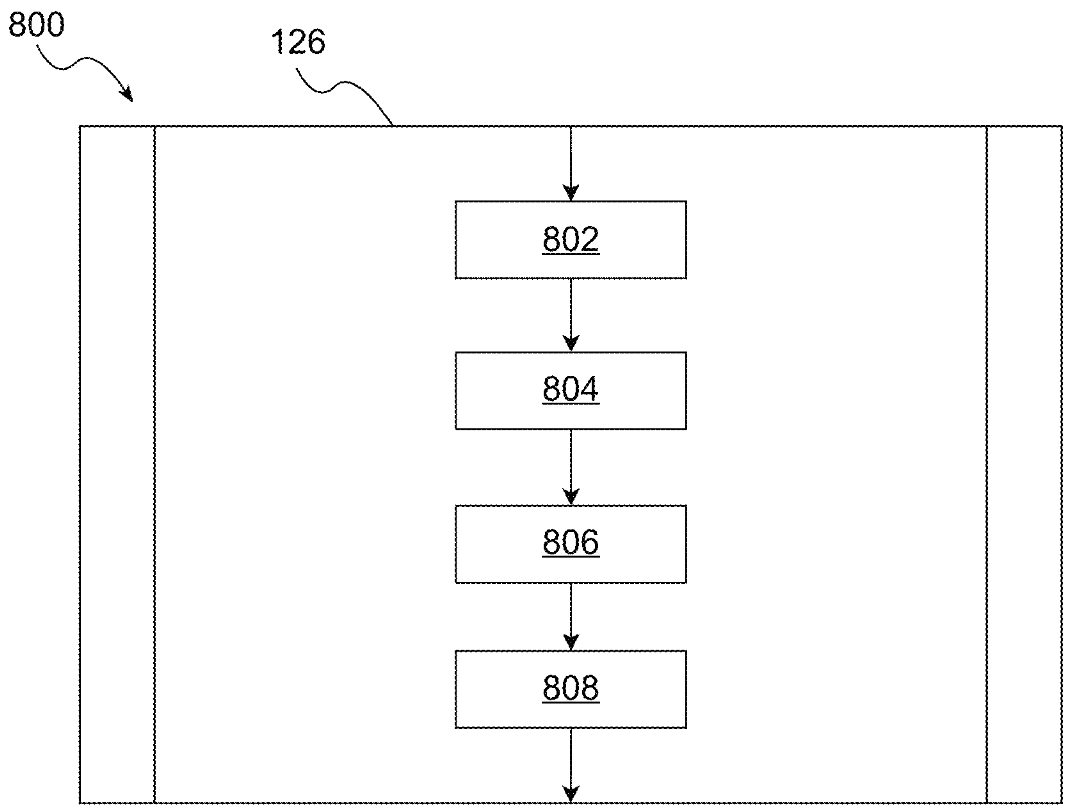
FIG. 8A is a flowchart of a method for determining a shoulder closure status of each of the plurality of road segments, according to an exemplary embodiment.

Referring to FIG. 8A, a flowchart of an exemplary embodiment 800 of block 126 (i.e., a method for determining a shoulder closure status of each of the plurality of road segments) is shown. The exemplary embodiment 800 of block 126 begins at block 802. At block 802, the server controller 50 determines a plurality of overall speed density distributions based at least in part on the telemetry data received at block 106 and/or historical telemetry data stored in the server database 52. Each of the plurality of overall speed density distributions describes a speed distribution of the plurality of remote vehicles within one of the plurality of road segments of the work zone.

Figure 8B:
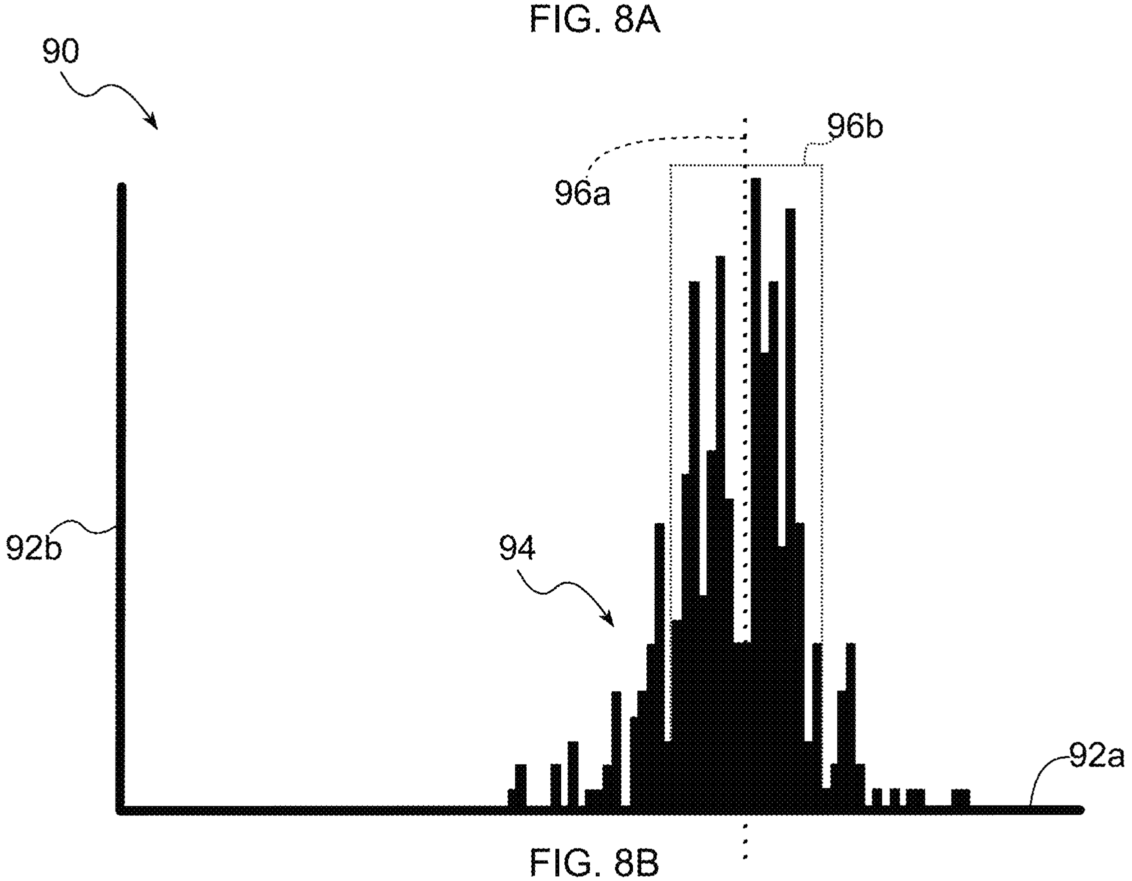
FIG. 8B is an exemplary speed distribution graph, according to an exemplary embodiment.

Referring to FIG. 8B, an exemplary speed distribution graph 90 is shown. The exemplary speed distribution graph 90 includes an x-axis 92*a* indicating speed (e.g., in kilometers per hour) and a y-axis 92*b* indicating frequency (i.e., a number of vehicles traveling at each speed within one of the plurality of road segments of the work zone). The exemplary speed distribution graph 90 further includes an exemplary speed distribution 94. Referring again to FIG. 8A, after block 802, the exemplary embodiment 800 of block 126 proceeds to block 804.

At block 804, the server controller 50 determines an average speed for each of the plurality of road segments based at least in part on the plurality of overall speed density distributions. In an exemplary embodiment, the average speed for one of the plurality of road segments is determined using a weighted average based on the frequency of each speed. Referring again to FIG. 8B, the exemplary speed distribution graph 90 further includes a second dashed line 96*a* indicating the average speed for one of the plurality of road segments. Referring again to FIG. 8A, after block 804, the exemplary embodiment 800 of block 126 proceeds to block 806.

At block 806, the server controller 50 generates a plurality of truncated overall speed density distributions by truncating each of the plurality of overall speed density distributions to within a predetermined range around the average speed determined at block 804. In a non-limiting example, the predetermined range is plus or minus ten kilometers per hour. In another non-limiting example, the predetermined range is plus or minus thirty kilometers per hour. Referring again to FIG. 8B, the exemplary speed distribution graph 90 further includes a second dashed box 96*b* indicating an exemplary truncated overall speed density distribution. Referring again to FIG. 8A, after block 806, the exemplary embodiment 800 of block 126 proceeds to block 808.

At block 808, the server controller 50 determines the speed limit for each of the plurality of road segments to be a truncated average speed. In an exemplary embodiment, the truncated average speed is determined using a weighted average based on the frequency of each speed within the truncated overall speed density distribution for each of the plurality of road segments. After block 808, the exemplary embodiment 800 of block 126 is concluded, and the method 100 proceeds as discussed above.

The system 10 and method 100 of the present disclosure offer several advantages. The system 10 and method 100 may be used to verify, correct, and/or update electronically transmitted work zone records or feeds such as WZDx work zone feeds and/or the like. The system 10 and method 100 allow perception and telemetry data to be crowdsourced from multiple vehicles and processed using the server system 14. The start location and the end location of work zones are determined using clustering techniques based on the crowdsourced perception data. The status of lanes, including lane shifts, lane closures, lane narrowing, shoulder closures, and speed limits are determined based on statistical analysis of the crowdsourced telemetry data. Accordingly, using the system 10 and method 100, reliability and accuracy of electronically transmitted information about road construction and road work zones may be increased.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for work zone detection for a vehicle, the method comprising:

receiving measurement data about an environment surrounding the vehicle using a vehicle sensor, wherein the measurement data includes perception data of the environment and telemetry data of a plurality of remote vehicles in the environment;

identifying a start location and an end location of a work zone based at least in part on the measurement data, wherein the work zone is represented as a plurality of road segments spanning from the start location to the end location, wherein identifying the start location and the end location of the work zone further comprises:

detecting a cluster of work zone objects in the environment based at least in part on the perception data, wherein the cluster of work zone objects includes at least one of: a work zone road sign, a work zone road barricade, a work zone vehicle, and a work zone worker, wherein detecting the cluster of work zone objects in the environment comprises:

detecting the cluster of work zone objects in the environment based at least in part on the perception data using a Density Based Spatial Clustering of Applications with Noise (DBSCAN) algorithm;

determining the start location and the end location of the work zone based at least in part on a location of the cluster of work zone objects; and dividing the work zone into a plurality of road segments spanning from the start location to the end location of the work zone, wherein each of the plurality of road segments has a same length;

determining a lane shift status of each of the plurality of road segments;

determining a lane closure status of each of the plurality of road segments;

determining a shoulder closure status of each of the plurality of road segments, wherein determining the lane shift status, the lane closure status, and the shoulder closure status further comprises:

determining a plurality of lane lateral density distributions, wherein each of the plurality of lane lateral density distributions corresponds to one of a plurality of lanes of one of the plurality of road segments of the work zone;

determining the lane shift status of each of the plurality of road segments based at least in part on the plurality of lane lateral density distributions;

determining the lane closure status of each of the plurality of road segments based at least in part on the plurality of lane lateral density distributions; and determining the shoulder closure status of each of the plurality of road segments based at least in part on the plurality of lane lateral density distributions; and determining a speed limit for each of the plurality of road segments.

2. The method of claim 1, wherein determining the plurality of lane lateral density distributions further comprises:

determining a plurality of overall lateral density distributions based at least in part on the telemetry data, wherein each of the plurality of overall lateral density distributions describes a spatial distribution of the plurality of remote vehicles within one of the plurality of road segments of the work zone; and separating the plurality of overall lateral density distributions into the plurality of lane lateral density distributions using a Gaussian mixture model (GMM), wherein each of the plurality of lane lateral density distributions corresponds to one of the plurality of lanes within one of the plurality of road segments of the work zone.

3. The method of claim 1, wherein determining the lane shift status of each of the plurality of road segments further comprises:

identifying a high-density area of each of the plurality of lanes within each of the plurality of road segments, wherein the high-density area is a region within each of the plurality of lanes having a lane lateral density distribution greater than or equal to a predetermined lateral density threshold;

determining an average location of the high-density area of each of the plurality of lanes across the plurality of road segments;

determining a plurality of lane-shifted road segments, wherein the plurality of lane-shifted road segments is a subset of the plurality of road segments, and wherein a location of the high-density area of at least one of the plurality of lanes in each of the plurality of lane-shifted road segments deviates from the average location of the high-density area of the at least one of the plurality of lanes by greater than or equal to a predetermined lane shift deviation threshold; and determining the lane shift status of each of the plurality of lane-shifted road segments to be a positive lane shift status.

4. The method of claim 1, wherein determining the lane closure status of each of the plurality of road segments further comprises:

determining an average lane density in each of the plurality of lanes across the plurality of road segments based at least in part on the plurality of lane lateral density distributions;

determining a plurality of lane-closed road segments, wherein the plurality of lane-closed road segments is a subset of the plurality of road segments, and wherein an average lane density of at least one of the plurality of lanes in each of the plurality of lane-closed road segments deviates from the average lane density of the at least one of the plurality of lanes by greater than or equal to a predetermined lane closed deviation threshold; and determining the lane closure status of each of the plurality of lane-closed road segments to be a positive lane closure status.

5. The method of claim 1, wherein determining the shoulder closure status of each of the plurality of road segments further comprises:

identifying a high-density area of each of the plurality of lanes within each of the plurality of road segments, wherein the high-density area is a region within each of the plurality of lanes having a lane lateral density distribution greater than or equal to a predetermined lateral density threshold;

determining an average high-density area width of each of the plurality of lanes across the plurality of road segments;

determining a plurality of shoulder-closed road segments, wherein the plurality of shoulder-closed road segments is a subset of the plurality of road segments, and wherein a width of the high-density area of at least one of the plurality of lanes in each of the plurality of shoulder-closed road segments deviates from the average high-density area width of the at least one of the plurality of lanes by greater than or equal to a predetermined shoulder closure deviation threshold; and determining the shoulder closure status of each of the plurality of shoulder-closed road segments to be a positive shoulder closure status.

6. The method of claim 1, wherein determining the speed limit for each of the plurality of road segments further comprises:

determining a plurality of overall speed density distributions based at least in part on the telemetry data, wherein each of the plurality of overall speed density distributions describes a speed distribution of the plurality of remote vehicles within one of the plurality of road segments of the work zone;

determining an average speed for each of the plurality of road segments based on the plurality of overall speed density distributions;

generating a plurality of truncated overall speed density distributions by truncating each of the plurality of overall speed density distributions to within a predetermined range around the average speed of each of the plurality of road segments; and determining the speed limit for each of the plurality of road segments to be a truncated average speed for each of the plurality of road segments based on the plurality of truncated overall speed density distributions.

7. The method of claim 1, further comprising:

transmitting the start location and end location of the work zone, the lane shift status of each of the plurality of road segments, the lane closure status of each of the plurality of road segments, the shoulder closure status of each of the plurality of road segments, and the speed limit of each of the plurality of road segments to a remote device.

8. A system for work zone detection for a vehicle, the system comprising:

a server system comprising:

a server communication system; and a server controller in electrical communication with the server communication system, wherein the server controller is programmed to:

receive measurement data about an environment using the server communication system, wherein the measurement data includes perception data of the environment and telemetry data of a plurality of remote vehicles in the environment;

identify a start location and an end location of a work zone based at least in part on the measurement data, wherein the work zone is represented as a plurality of road segments spanning from the start location to the end location, and wherein to identify the start location and the end location of the work zone, the server controller is further programmed to:

detect a cluster of work zone objects in the environment based at least in part on the perception data using a Density Based Spatial Clustering of Applications with Noise (DBSCAN) algorithm, wherein the cluster of work zone objects includes at least one of: a work zone road sign, a work zone road barricade, a work zone vehicle, and a work zone worker;

determine the start location and the end location of the work zone based at least in part on a location of the cluster of work zone objects; and divide the work zone into a plurality of road segments spanning from the start location to the end location of the work zone, wherein each of the plurality of road segments has a same length;

determine a lane shift status of each of the plurality of road segments;

determine a lane closure status of each of the plurality of road segments;

determine a shoulder closure status of each of the plurality of road segments;

determine a speed limit for each of the plurality of road segments; and transmit the start location and end location of the work zone, the lane shift status of each of the plurality of road segments, the lane closure status of each of the plurality of road segments, the shoulder closure status of each of the plurality of road segments, and the speed limit of each of the plurality of road segments to the plurality of remote vehicles using the server communication system.

9. The system of claim 8, wherein to determine the lane shift status of each of the plurality of road segments, the server controller is further programmed to:

determine a plurality of lane lateral density distributions, wherein each of the plurality of lane lateral density distributions corresponds to one of a plurality of lanes of one of the plurality of road segments of the work zone;

identify a high-density area of each of the plurality of lanes within each of the plurality of road segments, wherein the high-density area is a region within each of the plurality of lanes having a lane lateral density distribution greater than or equal to a predetermined lateral density threshold;

determine an average location of the high-density area of each of the plurality of lanes across the plurality of road segments;

determine a plurality of lane-shifted road segments, wherein the plurality of lane-shifted road segments is a subset of the plurality of road segments, and wherein a location of the high-density area of at least one of the plurality of lanes in each of the plurality of lane-shifted road segments deviates from the average location of the high-density area of the at least one of the plurality of lanes by greater than or equal to a predetermined lane shift deviation threshold; and determine the lane shift status of each of the plurality of lane-shifted road segments to be a positive lane shift status.

10. The system of claim 9, wherein to determine the lane closure status of each of the plurality of road segments, the server controller is further programmed to:

determine an average lane density in each of the plurality of lanes across the plurality of road segments based at least in part on the plurality of lane lateral density distributions;

determine a plurality of lane-closed road segments, wherein the plurality of lane-closed road segments is a subset of the plurality of road segments, and wherein an average lane density of at least one of the plurality of lanes in each of the plurality of lane-closed road segments deviates from the average lane density of the at least one of the plurality of lanes by greater than or equal to a predetermined lane closed deviation threshold; and determine the lane closure status of each of the plurality of lane-closed road segments to be a positive lane closure status.

11. The system of claim 10, wherein to determine the shoulder closure status of each of the plurality of road segments, the server controller is further programmed to:

determine an average high-density area width of each of the plurality of lanes across the plurality of road segments;

determine a plurality of shoulder-closed road segments, wherein the plurality of shoulder-closed road segments is a subset of the plurality of road segments, and wherein a width of the high-density area of at least one of the plurality of lanes in each of the plurality of shoulder-closed road segments deviates from the average high-density area width of the at least one of the plurality of lanes by greater than or equal to a predetermined shoulder closure deviation threshold; and determine the shoulder closure status of each of the plurality of shoulder-closed road segments to be a positive shoulder closure status.

12. The system of claim 11, wherein to determine the speed limit for each of the plurality of road segments, the server controller is further programmed to:

determine a plurality of overall speed density distributions based at least in part on the telemetry data, wherein each of the plurality of overall speed density distributions describes a speed distribution of the plurality of remote vehicles within one of the plurality of road segments of the work zone;

determine an average speed for each of the plurality of road segments based on the plurality of overall speed density distributions;

generate a plurality of truncated overall speed density distributions by truncating each of the plurality of overall speed density distributions to within a predetermined range around the average speed of each of the plurality of road segments; and determine the speed limit for each of the plurality of road segments to be a truncated average speed for each of the plurality of road segments based on the plurality of truncated overall speed density distributions.

13. The system of claim 8, further comprising:

a vehicle system comprising:

a vehicle sensor;

a vehicle communication system; and a vehicle controller in electrical communication with the vehicle sensor and the vehicle communication system, wherein the vehicle controller is programmed to:

receive the measurement data about the environment using the vehicle sensor; and transmit the measurement data to the server system using the vehicle communication system.

14. A method for work zone detection for a vehicle, the method comprising:

receiving measurement data about an environment surrounding the vehicle using a vehicle sensor, wherein the measurement data includes perception data of the environment and telemetry data of a plurality of remote vehicles in the environment;

identifying a start location and an end location of a work zone based at least in part on the measurement data, wherein the work zone is represented as a plurality of road segments spanning from the start location to the end location, wherein identifying the start location and the end location of the work zone further comprises:

detecting a cluster of work zone objects in the environment based at least in part on the perception data using a Density Based Spatial Clustering of Applications with Noise (DBSCAN) algorithm, wherein the cluster of work zone objects includes at least one of: a work zone road sign, a work zone road barricade, a work zone vehicle, and a work zone worker;

determining the start location and the end location of the work zone based at least in part on a location of the cluster of work zone objects; and dividing the work zone into a plurality of road segments spanning from the start location to the end location of the work zone, wherein each of the plurality of road segments has a same length;

determining a plurality of lane lateral density distributions, wherein each of the plurality of lane lateral density distributions corresponds to one of a plurality of lanes of one of the plurality of road segments of the work zone;

determining a lane shift status of each of the plurality of road segments based at least in part on the plurality of lane lateral density distributions;

determining a lane closure status of each of the plurality of road segments based at least in part on the plurality of lane lateral density distributions;

determining a shoulder closure status of each of the plurality of road segments based at least in part on the plurality of lane lateral density distributions;

determining a speed limit for each of the plurality of road segments; and transmitting the start location and end location of the work zone, the lane shift status of each of the plurality of road segments, the lane closure status of each of the plurality of road segments, the shoulder closure status of each of the plurality of road segments, and the speed limit of each of the plurality of road segments to a remote device.

15. The method of claim 14, wherein determining the lane shift status, the lane closure status, and the shoulder closure status further comprises:

identifying a high-density area of each of the plurality of lanes within each of the plurality of road segments, wherein the high-density area is a region within each of the plurality of lanes having a lane lateral density distribution greater than or equal to a predetermined lateral density threshold;

determining an average location of the high-density area of each of the plurality of lanes across the plurality of road segments;

determining a plurality of lane-shifted road segments, wherein the plurality of lane-shifted road segments is a subset of the plurality of road segments, and wherein a location of the high-density area of at least one of the plurality of lanes in each of the plurality of lane-shifted road segments deviates from the average location of the high-density area of the at least one of the plurality of lanes by greater than or equal to a predetermined lane shift deviation threshold;

determining the lane shift status of each of the plurality of lane-shifted road segments to be a positive lane shift status;

determining an average lane density in each of the plurality of lanes across the plurality of road segments based at least in part on the plurality of lane lateral density distributions;

determining a plurality of lane-closed road segments, wherein the plurality of lane-closed road segments is a subset of the plurality of road segments, and wherein an average lane density of at least one of the plurality of lanes in each of the plurality of lane-closed road segments deviates from the average lane density of the at least one of the plurality of lanes by greater than or equal to a predetermined lane closed deviation threshold;

determining the lane closure status of each of the plurality of lane-closed road segments to be a positive lane closure status;

determining an average high-density area width of each of the plurality of lanes across the plurality of road segments;

determining a plurality of shoulder-closed road segments, wherein the plurality of shoulder-closed road segments is a subset of the plurality of road segments, and wherein a width of the high-density area of at least one of the plurality of lanes in each of the plurality of shoulder-closed road segments deviates from the average high-density area width of the at least one of the plurality of lanes by greater than or equal to a predetermined shoulder closure deviation threshold; and determining the shoulder closure status of each of the plurality of shoulder-closed road segments to be a positive shoulder closure status.

* * * * *